United States Patent [19]

Peabody

[11] 4,116,924

[45] Sep. 26, 1978

[54] PIGMENT CONCENTRATIONS

[75] Inventor: Alice Robertson Peabody, Glens Falls, N.Y.

[73] Assignee: Hercules Incorporated, Wilmington, Del.

[21] Appl. No.: 736,919

[22] Filed: Oct. 29, 1976

Related U.S. Application Data

[63] Continuation-in-part of Ser. No. 596,113, Jul. 15, 1975, which is a continuation-in-part of Ser. No. 575,284, May 7, 1975, abandoned.

[51] Int. Cl.$^2$ ............................................... C08K 5/01
[52] U.S. Cl. ............................... 260/40 R; 260/42.21; 260/42.43; 106/308 M; 106/308 Q
[58] Field of Search ....................... 106/308 M, 308 Q; 260/26, 40 R, 42.21

[56] References Cited

U.S. PATENT DOCUMENTS

| | | | |
|---|---|---|---|
| T874,003 | 5/1970 | Tholstrup et al. | 260/40 R |
| 3,449,291 | 6/1969 | Lerman et al. | 106/308 Q |
| 3,458,804 | 7/1969 | Wolf et al. | 106/308 M |
| 3,615,812 | 10/1971 | Clark et al. | 106/308 M |
| 3,905,937 | 9/1975 | Khanna | 260/40 R |
| 3,922,232 | 11/1975 | Schein | 260/40 R |
| 3,969,302 | 7/1976 | Wegmann et al. | 260/40 R |
| 3,985,664 | 10/1976 | Sakaguchi et al. | 252/62.1 |

*Primary Examiner*—R. Dean
*Assistant Examiner*—John P. Sheehan
*Attorney, Agent, or Firm*—Hazel L. Deming

[57] ABSTRACT

A pelletizable pigment concentrate comprising an essentially agglomerate free intimate dispersion of by weight (a) from 20 to 55% of pigment, (b) from 5 to 35% of a friable dispersing resin selected from the group consisting of low molecular weight hydrocarbon type resins and rosin esters and having a softening point range of about 70° to about 195° C., and (c) from 30 to 65% of a polyester base, at least 30% of which is a copolyester of ethylene glycol, at least one aliphatic or cycloaliphatic diol containing 4 to 10 carbon atoms and at least one difunctional dicarboxylic acid or its ester derivative, said copolyester having an IV between about 0.45 and about 0.75 and a melting point range of about 140° to about 200° C.

7 Claims, No Drawings

PIGMENT CONCENTRATIONS

This application is a continuation-in-part of U.S. patent application Ser. No. 596,113, filed July 15, 1975, which is in turn a continuation-in-part of U.S. patent application Ser. No. 575,284, filed May 7, 1975, and now abandoned.

This invention relates to pigment concentrates and particularly to essentially agglomerate free pigment dispersions suitable for use in coloring fiber and film grade polymers such as linear polyesters.

In the practical production of pigment dispersions, the major problem has been how to achieve good dispersion without prolonged and expensive mechanical working. This problem has been particularly troublesome when working with plastics and particularly the fiber and film grade linear polyesters. Because of the high melting point of such polyesters, satisfactory blending on conventional hot roll milling equipment is not readily achieved and non-uniform distribution plus agglomerate formation often results. The formation of fibers from polyesters directly pigmented in this manner is difficult and the fibers therefrom often have impaired physical properties due to the extensive milling and high temperatures required to provide an extrudable material.

It has been proposed in Defensive Publication No. T874,003 to Tholstrup et al (May 12, 1970) that the foregoing problems can be avoided by first forming a pigment concentrate using certain copolyesters having a melting point in the range from about 150° to 240° C. as the carrier resin and then using this concentrate to color the higher melting polyesters. The degree of pigment dispersion which is obtained in this manner is vastly improved over the direct method for pigmenting polyesters. However, spinning performance is still subject to interruptions due to the presence of agglomerates and the attendant pressure build up on the filter pack.

It has also been suggested in U.S. Pat. No. 3,615,812 to Clark et al (Oct. 26, 1971) that highly pigmented resin compositions can be formed using such thermoplastic resins as the pentaerythritol esters of tall oil rosin or dimerized wood rosin or the nonpolar aromatic hydrocarbon resins having a melting point of at least about 100° C. The pigmented resins are easily pulverized to powder form and as such are readily dispersible in ink solvents or vehicles. The pigmented resins, however, are designed for coloring inks and their use for pigmenting polymers is not disclosed. Moreover, attempts to prepare a satisfactory pigmented linear polyester composition for use in making fibers by blending the pigmented resin with the polyester have been unsuccessful. The pigmented polyester composition gives poor spinning performance due to plugging and pressure build up at the filter pack and excessive breakage of the fibers also occurs during spinning.

Now in accordance with this invention it has been found that pigment dispersions which are essentially agglomerate free at relatively high pigment concentrations are provided by using as the carrier for the pigment a specified amount of certain friable dispersing resins and a polyester base, at least 30% of which is a copolyester having a melting point within the range of about 140° to about 200° C.

That high quality pigment dispersions are obtained using the carrier of this invention is indeed surprising since the dispersing resin or the copolyester-containing base individually do not provide the same high degree of dispersion. Further, the pigment dispersions of this invention offer the additional advantage of being pelletizable and therefore adapted to weight-feeding devices. Because the pigment concentrates of this invention are in a highly dispersed state and are agglomerate free, the concentrates can be mixed with natural or uncolored polymer in an extruder and melt spun directly into multi-filament fibers. Spinning performance is excellent, exhibiting almost no screen pack pressure build up and subsequent drawing of the fibers can be performed without breakage. Fibers of poly(ethylene terephthalate) colored with the concentrates of this invention show no evidence of incompatibility and yarns therefrom can be texturized without mark-off.

Accordingly, the present invention relates to a pelletizable pigment concentrate comprising an essentially agglomerate free intimate dispersion of by weight (a) from 20 to 55% of pigment, (b) from 5 to 35% of a friable dispersing resin having a softening point range of about 70° C. to about 195° C. and being selected from the group consisting of hydrocarbon type resins having a molecular weight range of from about 350 to about 2000 and rosin esters, and (c) from 30 to 65% of a polyester base, at least 30% of which is at least one copolyester of ethylene glycol, at least one aliphatic or cycloaliphatic diol containing 4 to 10 carbon atoms and at least one difunctional dicarboxylic acid or its ester derivative, said copolyester having an IV between about 0.45 and about 0.75 and a melting point range of about 140° to about 200° C.

The polyester base which is used to form the concentrates of this invention consists of from 30 to 100% of certain copolyesters of ethylene glycol, an aliphatic or cycloaliphatic diol and a difunctional dicarboxylic acid or its ester, the copolyesters having an intrinsic viscosity (IV) from about 0.45 to about 0.75, softening points (Fisher Johns) above about 65° C. and melting points (Fisher Johns) ranging from about 140° to about 200° C. Thus the polyester base can be made up entirely of one or more of the specified copolyesters or can be a mixture of at least one of the specified copolyesters with one or more different polyester components such as the polyalkylene terephthalates and particularly polybutylene terephthalate or copolyesters having intrinsic viscosities and/or melting points outside of the above range. The different polyester components will usually have melting points within the range of about 100° to about 240° C.

Copolyesters of the above type are known and are available commercially. Particularly preferred are the copolyesters of at least one difunctional dicarboxylic acid or its ester and an alcohol function comprised of from about 50 to about 97 mole percent of ethylene glycol and from about 3 to about 50 mole percent of at least one diol selected from the group consisting of aliphatic diols having 4 to 10 carbon atoms. Examples of aliphatic diols include 1,4-butanediol; diethylene glycol, 2,2,4-trimethyl-1,3-pentanediol; 2,2-dimethyl-1,3-propanediol (neopentyl glycol); 2-ethyl-2-butyl-1,3-propanediol; 1,5-pentanediol; 1,6-hexanediol; 1,7-heptanediol; 1,8-octanediol; 1,9-nonanediol; and 1,10-decanediol and examples of cycloaliphatic diols include 1,3-cyclobutanediol; 2,2,4,4-tetramethyl-1,3-cyclobutanediol; 1,2-cyclohexanedimethanol; 1,3-cyclohexanedimethanol; 1,4-cyclohexanedimethanol; 1,5-cyclooctanediol; and 1,6-cyclodecanediol.

Suitable difunctional dicarboxylic acids include oxalic; malonic; dimethylmalonic; succinic; glutaric; adipic; pimelic; azelaic, sebacic; 1,3-cyclopentane dicarboxylic; 1,2-cyclohexane dicarboxylic; 1,3-cyclohexane dicarboxylic; 1,4-cyclohexane dicarboxylic; phthalic; isophthalic; terephthalic; 2,5-norbornane dicarboxylic; 1,4-naphthalic; t-butyl-isophthalic; diphenic; 4,4'-sulfonyldibenzoic; 4,4'-oxydibenzoic; 2,5-naphthalene dicarboxylic; 2,6-naphthalene dicarboxylic; and 2,7-naphthalene dicarboxylic acids. Ester-forming derivatives of these acids are also useful and include dimethyl-1,4-cyclohexanedicarboxylate; dimethyl-2,6-naphthalenedicarboxylate; dimethyl-4,4'-sulfonyldibenzoate; dimethyl isophthalate; dimethyl terephthalate; and diphenyl terephthalate. Two or more of the above acids or ester-forming derivatives thereof may be used in preparing the copolyester.

The concentrates of this invention also contain in addition to the stated amount of pigment and polyester base, from 5 to 35% of certain friable dispersing type resins of the hydrocarbon or rosin ester type. The dispersing resins, at the levels used, should be compatible with the polyester base, i.e., not exhibit phase separation under conditions of use and should be sufficiently heat stable at temperatures up to about 280° C. so that any weight loss will be less than about 10%. The hydrocarbon type resins employed in this invention are non-crystalline thermoplastic synthetic polymers having a ring and ball softening point of from about 70° to about 195° C., preferably from about 100° to about 180° C.; a molecular weight within the range of from about 350 to about 2000, preferably from about 400 to 1400; and an acid number of less than about 1. The types of hydrocarbon resins which have the above properties include: the petroleum resins obtained by the catalytic polymerization of a mixture of monomers derived from the deep cracking of petroleum, which monomers are chiefly mono- and diolefins; the polyterpene resins obtained by the polymerization or copolymerization of terpene hydrocarbons such as the alicyclic, monocyclic and bicyclic terpenes and their mixtures, including alloocimene, carene, isomerized pinene, pinene, dipentene, terpinene, terpinolene, turpentine, a terpene cut or fraction, and various other terpenes; the terpenephenol resins obtained by condensing various terpenes such as dipentene, pinene, limonene and various turpentine cuts with phenols, such as phenol, cresol, alkylated phenols, for example, normal butyl phenol, tertiary butyl phenol, propyl phenol and the like, in the presence of a catalyst such as sulfuric acid, sulfonic acid, aluminum chloride, boron trifluoride or the molecular compounds of boron trifluoride with ethers, acids, alcohols and phenols; polymers of unsaturated coal tar-by-products such as the polyindenes and coumarone-indene resins; the styrene resins, as for example, polystyrene, poly($\alpha$-methyl styrene), styrene-olefin and styrene-diolefin copolymers, styrene-terpene copolymers, styrene-acrylonitrile copolymers, styrene-vinyl toluene copolymers, $\alpha$-methyl styrene-vinyl toluene copolymers, styrene-$\alpha$-methyl styrene copolymers, etc.; and the hydrogenated form of any of the above types of resins produced by any of the usual hydrogenation processes, generally carried out utilizing a catalyst such as nickel, nickel-on-kieselguhr, copper chromite, palladium-on-carbon, platinum-on-alumina, or cobalt plus zirconia or kieselguhr and preferably in the presence of a solvent such as methyl cyclohexane, toluene, p-menthane, etc. at pressures ranging from 500 to 10,000 p.s.i. and a temperature of 150° to 300° C. All of the above hydrocarbon resins can be prepared by methods known in the art. The hydrocarbon type resins are relatively stable to light and heat, are also fully thermoplastic and at temperatures above their melting points are free-flowing liquids of low viscosity (dependent upon temperature) which return to the solid state upon cooling. Typical resins of the above types are the petroleum resins commercially available as the Picco 6000 Resins, the Piccovar Resins and the Inkovar Resins of Hercules Incorporated, and the Velsicol XL and AD resins of Velsicol Chemical Corp.; the polyterpene resins commercially available as the Piccolyte Resins of Hercules Incorporated; the terpene-phenol resins commercially available as the Piccofyn Resins of Hercules Incorporated; the polymers of unsaturated coal tar by-products commercially available as the Piccoumaron Resins of Hercules Incorporated and the Cumar resins of Allied Chemical Corp.; and the styrene resins commercially available as the Piccolastic Resins, Piccotex Resins, Piccoflex Resins and Kristalex Resins of Hercules Incorporated.

The rosin ester type resins which are friable and useful in this invention have drop softening points from about 100° C. to about 195° C. and are preferably pentaerythritol or glycol esters of rosin, hydrogenated rosin modified rosin, or dimeric resin acids. These ester type resins are available commercially as the Pentalyn, Lewisol, Staybelite Ester and Foral Resins of Hercules Incorporated, the Arochem Resins of Archer Daniels Midland Co. and the Ester Gums of Crosby Chemical Company.

The following resins are illustrative of the preferred hydrocarbon type resins and rosin esters that can be used in this invention.

Resin A

A suitable hydrocarbon resin that can be used in this invention is an aromatic hydrocarbon resin derived from petroleum sources and available commercially under the proprietary designation Picco 6140–3. This resin has a ring and ball softening point of about 140° C., a molecular weight of about 1000, and an acid number of less than 1.

Resin B

Another suitable hydrocarbon resin is that available commercially as Inkovar AB-180. This resin has a ring and ball softening point of about 180° C., a molecular weight of about 1100, and an acid number of less than 1.

Resin C

Yet another suitable hydrocarbon type resin is the low molecular weight terpene-phenol resin available commercially under the proprietary designation Piccofyn D-125. This resin has a ring and ball softening point of about 125° C. and an acid number less than 1.

Resin D

Still another suitable hydrocarbon type resin is the low molecular weight copolymer of $\alpha$-methyl styrene and about 10% of styrene having a ring and ball softening point of about 140° C. and an acid number less than 1.

Resin E

Another resin that can be used in this invention is a modified rosin ester available commercially under the proprietary name Arochem 534. This resin is of low molecular weight and has a melting point (mercury method) of about 147°–157° C. The acid number of this resin is 10 to 20.

Resin F

Another resin that can be used in this invention is a pentaerythritol ester of dimeric resin acids available commercially under the proprietary name Pentalyn K. This resin has a Hercules method drop softening point of about 191° C. and a molecular weight of about 700. The acid number of this resin is less than about 13.

Pigments which can be dispersed in accordance with this invention are any of the solid colorants normally used in the industry for the coloring, opacifying, delustering or otherwise modifying the color of plastics. These include the inorganic and organic prime pigments, extender pigments, metallic pigments, the various finely-divided channel and furnace blacks, and the like. Typical pigments include organic pigments such as the diarylide yellows, the phthalocyanine blues and greens, the quinacridone reds and violets, dioxazine violet, and the like; and inorganic pigments such as the cadmium reds and yellows, the cadmium sulfide type pigments, the molybdate oranges, iron oxide yellow and red, and the like. Also suitable are the hydrophilic type pigments such as, for example, titanium dioxide and the lead chromate colors.

The pigment concentrates of this invention can be prepared by forming an aqueous dispersion of the pigment, preferably in the presence of a water-soluble or water-dispersible cationic or anionic surfactant which is convertible to an oil-soluble, water-insoluble form, mixing the aqueous pigment dispersion with a solution of the dispersing resin in an organic solvent therefor, flushing the pigment from the aqueous phase to the resin phase, recovering the pigment resin phase and then blending the pigment resin phase with the polyester base at above the melting point of the polyester, usually under conditions of shear.

Preparation of the aqueous pigment dispersion can be accomplished by pebble milling or grinding in a colloid mill or the like, a mixture of pigment and water and preferably a suitable cationic or anionic surfactant to produce a colloidal, free-flowing aqueous dispersion of the pigment. Either dried pigment and water or a pigment presscake may be used as the pigment source. Presscakes are preferred where possible as these avoid the aggregation that normally occurs during drying of the pigment. Calcined pigments such as titanium dioxide, cadmium yellows and reds are not available in this form and must be used as dried pigments. Organic pigments such as phthalocyanine blue and green, etc., are available in a presscake form and are advantageously used in this form. The amount of water is not critical, the practical requirement being that sufficient water be present to permit satisfactory processing.

The presence of a surfactant is optional but usually desirable to aid in pigment wetting at this stage and to facilitate granule formation at a later stage. Cationic and anionic surfactants which are useful will have sufficient heat stability to withstand subsequent processing temperatures without decomposition and should be non-reactive with any of the resinous components of the concentrate or polymers with which the concentrate is to be used. Particularly preferred cationic surfactants are the substituted tertiary amines which are heterocyclic tertiary amines such as the alkyl imidazolines and oxazolines. They are capable of forming water-soluble salts with various acids and as their acetate salts are excellent surfactants with good solubility in water. One of the preferred imidazolines is 1-(2-hydroxyethyl)-2-n-heptadecenyl-2-imidazoline.

Anionic surfactants which have sufficient heat stability for subsequent plastic processing, and which can be converted to a water-insoluble, oil-soluble form are also suitable. Typical anionic surfactants include sodium oleate, sodium laurate, sodium palmitate, sodium stearate, sodium naphthenate, sulfonated castor oil, sulfonated petroleum, sulfonated tall oil and the like. Also acceptable are anionic surfactants such as Tergitol 4 (the sodium sulfate derivative of 7-ethyl-2-methyl-4-undecanol), Igepon AC-78 (the coconut oil acid ester of sodium isethionate) and Aerosol 22 (tetrasodium-N-(1,2-dicarboxyethyl)-N-octadodecyl sulfosuccinimate). The substituted alkyl group is critical only as it affects the water solubility of the free base and effectiveness of the salt as wetting agent. In general, alkyl chain lengths from about seven carbon atoms to about 19 carbon atoms are operative, the limiting factors being the water solubility of the free base in the shorter chain lengths and the water insolubility of the salts with resultant reduced effectiveness as surfactants in the longer chain lengths beyond 19 carbon atoms. Preferred length of the alkyl chain is from about 11 to about 17 carbon atoms.

The choice and amount of surfactant will, of course, vary depending upon a number of factors which include the type of pigment, the HLB value of the surfactant and the particular solvent. Generally, the amount of surfactant will depend upon the type of pigment and its surface area. Usually, inorganic pigments such as cadmium sulfide yellow or titanium dioxide white which have average particle sizes within the range of from about 0.1 micron to about 2.0 microns require only a small amount of surfactant. On the other hand, organic pigments which have a much higher surface area require larger proportions of surfactant. Usually, if present, the amount of surfactant will range from about 2 to about 25% based on the weight of the pigment.

Following formation of the aqueous pigment dispersion the pigment is transferred or flushed from the aqueous medium to a solution of the desired amount of dispersing resin in a solvent. This step of the process can be carried out in any suitable apparatus such as an agitated tank fitted with suitable steam and water lines. Sufficient water is added to the tank to dilute the pigment dispersions subsequently added, to a point where it is possible to maintain adequate fluidity throughout the process. A pigment concentration from about 5 to about 12% will usually be sufficient to maintain this fluidity. This, however, is not critical and can be varied from less than about 1% to about 15% or more. The dispersing agent and solvent, for example, hydrocarbon solvent, are added to the water and the mixture heated. The temperature of heating is not critical during the flushing operation and may range from about 40° to about 100° C. A preferred temperature range for ideal conditions is from about 90° to about 100° C. The previously prepared pigment dispersion is then added and after a few minutes' stirring, a homogeneous fluid mixture is obtained. Transfer or flushing of the pigment to the non-aqueous phase is accomplished by precipitating the surfactant, if present, as an oil-soluble or oil-dispersible compound or by evaporating off the solvent. In the case of cationic surfactants, this is accomplished by treatment of the dispersion with an alkali to convert the cationic surfactant to a water-insoluble, oil-soluble free base or through use of a suitable anionic material which will combine with the cationic surfactant to form a water-insoluble, oil-soluble or oil-dispersible compound. While the preferred alkali for use herein is sodium hydroxide, other alkalis such as sodium carbonate, potassium hydroxide, potassium carbonate, ammonium hydroxide and water-soluble organic bases such as triethanolamine or morpholine can be used. Any anionic material which will chemically react with the cationic surfactant to form a water-insoluble, oil-soluble or oil-dispersible compound can be used herein. Thus, any of the anionic surfactants listed hereinabove as suitable for forming the initial pigment dispersions in accordance with the invention can be used provided they have the required reactivity with the cationic surfactant. In the case of anionic surfactants, precipitation can be accomplished by adding to the dispersion a water-soluble salt of any of the cationic amine surfactants described herein as suitable for forming the initial pigment dispersions and which will react with the anionic surfactant to produce a water-insoluble, oil-soluble or oil-dispersible compound. It is not necessary, however, that the cationic surfactant utilized for precipitating the anionic surfactant be operable as an aqueous pigment dispersant in its own right. On the contrary, all that is necessary is that the cationic surfactant be capable of reacting with the anionic surfactant to form a water-insoluble, oil-soluble or oil-dispersible compound and any cationic surfactant which will meet this requirement is satisfactory for use herein. Some cationic materials which fall in this category are primary and secondary fatty amines such as coconut amine, soybean oil amine, hydrogenated tallow amine, dehydrogenated tallow amine and oleyl amine.

Conversion of the surfactant to a water-insoluble, oil-soluble or oil-dispersible form or removal of the solvent transfers the pigment to the non-aqueous phase and the mixture separates into two distinct phases comprising a colorless aqueous phase and a colored non-aqueous phase in the form of small pigment granules. Heating is usually, although not necessarily, employed to steam distill at least a part of the organic solvent from the mixture so that the granules will be firm enough to be transported to separatory means for removing the bulk of the water. After dewatering, the granules are washed and dried in conventional manner. For example, dewatering can be carried out by running the cooled bath through any type of conventional filtering apparatus such as a filter press, screen, etc. The partially dewatered granules can then be washed with fresh water to remove residual salts. Drying can be accomplished by conventional means such as tray driers, vacuum driers, etc.

Blending of the pigment granules with the polyester base can be carried out in any convenient manner for intimately mixing two thermoplastic materials. A particularly convenient method is to dry blend the polyester base and granules and then pass the blend to an extruder with a suitable mixing screw and fitted with a strand die. The extrudate in strand form can be pelleted and the pellets used directly for let down with pellets of uncolored polymer. Similar blending can be accomplished by milling the mixture on a two-roll mill.

The concentrates of this invention can be used to color a wide variety of plastics but are particularly useful for coloring the thermoplastic linear polyesters which are homopolyesters, copolyesters or terpolyesters comprising a series of predominantly carbon atom chains joined by recurring carbonyloxy radicals

Included, for example, are the polyesters disclosed in U.S. Pat. Nos. 2,465,319; 2,901,466; and 3,018,272. Particularly preferred are the polyesters having an intrinsic viscosity of at least about 0.3 and preferably at least about 0.4 prepared from dicarboxylic acids or ester-forming derivatives thereof and glycols, for example, poly(ethylene terephthalate), poly(propylene terephthalate), poly(tetramethylene terephthalate), poly(2,2-dimethyl-1,3-propylene terephthalate), poly(cyclohexane-dimethanol terephthalate), poly(ethylene bibenzoate), and copolyesters of terephthalic acids with an aromatic dicarboxylic acid such as ethylene terephthalate-ethylene isophthalate copolyesters and copolyesters of an aromatic dicarboxylic acid such as terephthalic acid with one or more aliphatic dicarboxylic acids such as adipic acid, sebacic acid or azelaic acid. Typical aromatic dicarboxylic acids include phthalic acid, isophthalic acid and terephthalic acid and typical glycols include ethylene glycol, propylene glycol, hexamethylene glycol, 1,4-cyclohexane dimethanol and the like.

Other ingredients such as heat and light stabilizers, antioxidants, antistatic agents, viscosity improvers, mold release agents, flame retardants, fillers, extenders and the like can also be present in the pigmented compositions of the invention in amounts which do not detract from the advantages of the invention. Such ingredients can be incorporated as an additive during the preparation of the concentrate or later, as in the blending step of the concentrate and copolyester. Usually, the amount of such additives will not exceed about 1 or 2 percent by weight of the total composition.

Having described the invention generally, the following examples are given to illustrate specific embodiments thereof. All parts and percentages are by weight unless otherwise indicated.

EXAMPLE 1

110 Parts of carbon black dry color (Regal 660) were charged into a pebble mill with 27.5 parts of the cationic surfactant 1-(2-hydroxyethyl)-2-n-heptadecyl-2-imidazoline acetate and 302.5 parts of water. This mixture was ground for 20 hours, dumped and then given two passes through a Gaulin mill at 4500–5000 p.s.i. The product was a fluid aqueous dispersion of carbon black whose particles were colloidal in character (predominantly under 0.5 micron in size with a rare maximum to 8 microns).

An agitated stainless steel flushing tank was charged with 1200 parts of water, the above aqueous pigment dispersion and 90 parts of a ground aromatic hydrocarbon resin derived from petroleum sources and having a ball & ring softening point of about 140° C. (Resin A). The charge was agitated for 10 minutes following which time 54 parts of mineral spirits were added and the mixture was heated to 80° C. under agitation. Next approximately 3 parts of sodium hydroxide (as a 50% aqueous solution) were added to adjust the pH to 9.5–10.0. At this point the aqueous phase was completely free of color and the pigmented phase was in the form of small granules. The mixture was next heated to and maintained at 96° C. until the solvent (mineral spirits) was steam distilled, after which cooling water was added to reduce the temperature to 50° C. and harden the granules. The batch was stirred for 10 minutes and then run out onto a screen where the bulk of the water was removed. The partly dewatered material was thoroughly washed with water and then dried in a circulating air oven at 82° C. for 40 hours. The dried product (less than 0.12% water, Karl Fisher method) was in the form of fine granules and contained 48.3% of carbon black, 39.6% of Resin A and 12.1% of the surfactant.

100 Parts of the above granules were tumble blended with 61 parts of a dried and pulverized linear copolyester containing as mole % of the copolyester 27.7% of ethylene glycol, 22.9% of neopentyl glycol, 1.0% of diethylene glycol, 22.0% of terephthalic acid, 23.8% of isophthalic acid and 2.6% of sebacic acid, the copolyester having an intrinsic viscosity of 0.74 and a melting point (Fisher Johns) of 145° C. The blend was extruded through a non-vented extruder fitted with a 2-stage compounding screw and a strand die at about 149° C. and the strands were chopped into pellets approximately 3/32 × 3/32 inches in size. The pelleted concentrate contained 30% of carbon black, 24.5% of Resin A, 38% of the copolyester and 7.5% of the surfactant. When the concentrate was let down to a 0.5% pigment level with ground clear poly(ethylene terephthalate) having an intrinsic viscosity of 0.60 (60/40 phenol/tetrachloroethylene) and a melting point of 265° C., microscopic studies on pressed film therefrom indicated that the pigment was evenly dispersed throughout the poly(ethylene terephthalate) and that the average size of the pigment particles was less than 0.5 micron, with rare aggregates or flocculates up to 9 microns.

133 Parts of the above pigment pellets were dry blended with 1867 parts of the ground clear poly(ethylene terephthalate) used above, the blend was spun at 293° C. into continuous 3.9 denier filaments at the rate of 590 meters/minute using a 35 filament die and the resulting filaments were drawn at a draw ratio of 4:1. Spinning performance was excellent and the fiber so produced were uniformly colored and had a high jet black luster. The fibers had a tenacity of 2.7 grams/denier, an elongation of 49%, a modulus of 66 grams/denier and an intrinsic viscosity of 0.490. When yarn therefrom was texturized by false twisting, there was no evidence of mark off. Fibers produced in the same manner from poly(ethylene terephthalate) which was not blended with the pigment pellets gave clear fibers having a tenacity of 3.8 grams/denier, an elongation of 37%, a modulus of 79 grams/denier and an intrinsic viscosity of 0.573.

When the dried granules produced above (containing 48.3% of carbon black, 39.6% of Resin A and 12.1% of the surfactant) were directly let down to a 2.0% pigment level in the clear poly(ethylene terephthalate) used above by dry blending 100 parts of the granules with 2315 parts of the poly(ethylene terephthalate) and the blend spun into filaments as above, spinning performance was erratic and excessive filament breakage occurred due to plugging of the filter. When a similar blend was worked under conditions to simulate extrusion and then cast into film, microscopic examination showed that the degree of dispersion was poorer than that obtained using the pellets of this example and that although the average size of the pigment particles was less than 0.5 micron, the particle size was much larger with occasional aggregates up to 30 microns.

Dried granules were also prepared according to the procedure of this example except that 120 parts of carbon black and 80 parts of Resin A were used. 100 Parts of the dried granules, while warm, were dry blended with 109 parts of ground clear poly(ethylene terephthalate) having an intrinsic viscosity of 0.86 and having been previously dried for 2 hours at 150° C. The blend was extruded at 293° C. onto a rotating Teflon belt using a 1½ inches extruder fitted with a 2-stage compounding screw and a 100-mesh screen filter pack, a nitrogen blanket being used in the feed hopper. The ribbon extrudate was rough and very brittle, broke readily, indicating poor cohesiveness and could not be pelletized. When the extrudate was let down to a 0.5% pigment level with the clear poly(ethylene terephthalate) of this example, microscopic examination indicated that the dispersion quality was poor with several particles in the 18 to 64 micron range. When the above extrudate was redried and reextruded as above, dispersion quality was still poor and deterioration of the resin occurred. This was evidenced by the decrease in the intrinsic viscosity of the poly(ethylene terephthalate) from 0.86 before extrusion to 0.51 after the first extrusion and then to 0.35 after reextrusion.

When 100 parts of the carbon black dry color (Regal 660) were dry blended with 5000 parts of the ground clear poly(ethylene terephthalate) having an intrinsic viscosity of 0.60 and extruded into strands using the compounding extruder of this example, dispersion quality was very poor and essentially all of the particles ranged from 4 to 27 microns with a maximum particle size of 200 microns.

EXAMPLE 2

140 Parts (dry pigment basis) of α-copper phthalocyanine blue presscake were charged into a pebble mill with 28 parts of the surfactant of Example 1 and sufficient water to give a charge totaling 700 parts. This mixture was ground for 20 hours, dumped and then given two passes through a Gaulin mill at 4500–5000 p.s.i. The product was a fluid aqueous dispersion.

An agitated stainless steel flushing tank was charged with 1200 parts of water, the above aqueous dispersion and 140 parts of ground Resin A and the charge was agitated for 10 minutes following which time 105 parts of mineral spirits were added and the mixture was heated to 88° C. with agitation. Sufficient 50% sodium hydroxide was next added to adjust the pH to 9.0–9.5 and the batch was heated to and maintained at 94° C. until the solvent was removed, after which additional water was added to reduce the temperature to 50° C. and the product was recovered as in Example 1. The dried product was in the form of fine granules and contained 45.45% of α-copper phthalocyanine blue pigment, 45.45% of Resin A and 9% of the surfactant.

100 Parts of the above granules were tumble blended with 82 parts of the copolyester of Example 1 and the blend was extruded into strands at a die temperature of about 177° C. and the strands chopped into pellets approximately 3/32 × 3/32 inches in size.

The pelleted concentrate contained 25% of α-copper phthalocyanine blue pigment, 25% of Resin A, 45% of the copolyester and 5% of the surfactant. When the concentrate was let-down to a 0.5% pigment level with the clear poly(ethylene terephthalate) of Example 1, microscopic studies indicated that the pigment dispersion was uniform and that the pigment particles were in the submicron range with rare units up to 4 microns in size. When the concentrate was let down to a 2% pigment loading in the poly(ethylene terephthalate) and spun into 4.2 denier filaments and drawn according to the procedure of Example 1, the fibers had a tenacity of 3.2 grams/denier, an elongation of 46%, a modulus of 71 grams/denier and an intrinsic viscosity of 0.475. Yarn therefrom was texturized without mark-off.

EXAMPLE 3

185 Parts of cadmium selenide orange pigment were charged into a pebble mill with 9.25 parts of 1-(2-hydroxyethyl)-2-n-heptadecenyl-2-imidazoline acetate and 176 parts of water. This mixture was ground for 20 hours, dumped and then given two passes through a Gaulin mill at 4500–5000 p.s.i. The product was a fluid aqueous pigment dispersion.

An agitated stainless steel flushing tank was charged with 1200 parts of water, the above aqueous pigment dispersion, 22 parts of ground Resin A and 154 parts of a dried and pulverized (less than 40 mesh) linear copolyester containing as mole % of the copolyester 27.6% of ethylene glycol, 22.1% of neopentyl glycol, 0.8% of diethylene glycol, 25.2% of terephthalic acid and 24.3% of isophthalic acid, the copolyester having an intrinsic viscosity of 0.59 and a melting point (Fisher Johns) of 150°–155° C. The charge was agitated for 10 minutes following which 14 parts of mineral spirits were added and the mixture was heated to 40° C. under agitation. Next 6.3 parts of sodium metaphosphate were added and the mixture was agitated for 5 minutes, the pH being approximately 6. The mixture was next heated to 85° C. at the rate of 2° C./minute and then to 94° C. at the rate of 1° C./minute. The mixture was maintained at 94° C. until the solvent was removed, cooling water was added to reduce the temperature to 50° C. and the product was recovered as in Example 1. The dried product (less than 0.12% water, Karl Fisher method) was in the form of fine granules and contained 50% of cadmium orange pigment, 6% of Resin A, 41.4% of the copolyester resin and 2.5% of the imidazoline surfactant.

The above granules were melt-extruded into strands using the extruder of Example 1 and the strands were chopped into pellets. When the pelleted concentrate was let down in the clear poly(ethylene terephthalate) of Example 1 to a 0.5% pigment level, microscopic studies revealed that the dispersion quality was good and that essentially all of the pigment particles were of a size of 1 micron or less.

When the pelleted concentrate was let down to a 2% loading in the poly(ethylene terephthalate) and spun into 3.6 denier filaments and drawn according to the procedure of Example 1, the fibers had a tenacity of 4.4 grams/denier, an elongation of 38%, a modulus of 90 grams/denier and an intrinsic viscosity of 0.540. Yarn therefrom was texturized with no mark-off.

EXAMPLE 4

The procedure of Example 3 was repeated except that cadmium sulfide yellow was substituted for the cadmium selenide orange; the flushing tank was charged with 1200 parts of water, 26 parts of ground Resin A and 150 parts of a dried and pulverized linear copolyester containing as mole % of the copolyester 49.3% of ethylene glycol, 1.9% of diethylene glycol, 29.1% of terephthalic acid and 19.8% of isophthalic acid, the copolyester having an intrinsic viscosity of 0.59 and a melting point (Fisher Johns) of about 140° to 157° C.; and 15.5 parts of mineral spirits and 6.2 parts of sodium meta-phosphate were employed. The dried granular product of this example contained 50% of cadmium sulfide yellow, 7.0% of Resin A, 40.5% of the copolyester and 2.5% of the surfactant.

The above granules were melt extruded into strands and chopped into pellets as in Example 3. When the pelleted concentrate was let down to a 2% loading in the clear poly(ethylene terephthalate) of Example 1 and spun into 4 denier filaments and drawn according to the procedure of Example 1, the fibers had a tenacity of 3.6 grams/denier, an elongation of 44%, a modulus of 66 grams/denier and an intrinsic viscosity of 0.532. Yarn therefrom was texturized with no evidence of mark-off.

EXAMPLE 5

The procedure of Example 1 was repeated except that 61 parts of the copolyester of Example 3 were substituted for the 61 parts of the copolyester of Example 1. When the pelleted concentrate was let down to a 2% loading in the clear poly(ethylene terephthalate) and spun into 4 denier filaments and drawn according to the procedure of Example 1, the fibers had a tenacity of 2.4 grams/denier, an elongation of 37%, a modulus of 66 grams/denier and an intrinsic viscosity of 0.465. Yarns therefrom showed no mark-off on texturizing.

EXAMPLE 6

The procedure of Example 1 was repeated except that the pebble mill was charged with 100 parts (dry pigment basis) of carbazole violet presscake, 20 parts of the surfactant of Example 3 and sufficient water to provide a total charge of 416 parts and the mixture was ground for 40 hours; the flushing tank was charged with 1200 parts of water, the aqueous pigment dispersion and 100 parts of ground Resin A; 60 parts of mineral spirits were added following agitation for 10 minutes and the mixture was heated to 88° C.; 2.2 parts of sodium hydroxide were added as a 50% aqueous solution to adjust the pH; and 82 parts of the copolyester were blended with 100 parts of the granules. The pelleted concentrate exhibited excellent dispersion quality and contained 25% of carbazole violet, 25% of Resin A, 45% of the copolyester and 5% of the surfactant.

When the pelleted concentrate was let down to a 0.5% pigment level with the clear poly(ethylene terephthalate) of Example 1, dispersion quality was excellent and the particles were substantially of submicron size with some crystals up to 10–12 microns. When the pelleted concentrate was let down to 2% loading in the poly(ethylene terephthalate) and spun into 4 denier filaments and drawn according to the procedure of Example 1, the fibers had a tenacity of 2.7 grams/denier, an elongation of 52%, a modulus of 66 grams/denier and an intrinsic viscosity of 0.472.

EXAMPLE 7

A charge of 100 parts (dry pigment basis) of copper phthalocyanine green presscake, 15 parts of the surfactant of Example 3 and sufficient water to give a total charge of 333 parts was mixed in a vessel and the mixture passed once through a trihomo colloid mill and four times through a Gaulin mill at 4500–5000 p.s.i.

An agitated flushing tank was charged with 1200 parts of water, the pigment dispersion produced above and 100 parts of ground Resin A and the charge was agitated for 10 minutes following which time 65 parts of mineral spirits were added and the mixture was heated to 88° C. with agitation. Approximately 1.7 parts of sodium hydroxide were added as a 50% aqueous solution to adjust the pH, the batch was heated to remove the solvent and a dried granular product was recovered therefrom according to the procedure of Example 2. The granules contained 46.5% of copper phthalocyanine green, 46.5% of Resin A and 7.0% of the surfactant.

One hundred parts of the above granules were tumble blended with 86 parts of the copolyester of Example 3, the blend was extruded into strands and the strands were chopped into pellets as in Example 1. The pelleted concentrate so produced contained 25% of copper phthalocyanine green, 25% of Resin A, 46.25% of the copolyester resin and 3.75% of the surfactant.

When the pelleted concentrate was let down to a 0.5% pigment level with the clear poly(ethylene terephthalate) of Example 1, dispersion quality was excellent and essentially all of the particles were of submicron size. When the pelleted concentrate was let down to 2% pigment loading with the poly(ethylene terephthalate) and spun into fiber and drawn according to Example 1, the physical properties of the fiber were good and yarn therefrom showed no mark-off on texturizing.

EXAMPLE 8

The procedure of Example 2 was repeated except that: the pebble mill was charged with 100 parts (dry pigment basis) of Perylene Red pigment presscake, 25 parts of the surfactant of Example 3 and sufficient water to provide a total charge of 500 parts; the grinding time was 40 hours; and 70 parts of mineral spirits and 2.8 parts of sodium hydroxide were used as a 50% aqueous solution in the granulation step. The pelleted concentrate of this example contained 25% of Perylene Red pigment, 25% of Resin A, 43.8% of the copolyester and 6.2% of the surfactant.

When the concentrate was let down to a 0.5% pigment level in the clear poly(ethylene terephthalate) of Example 1, microscopic studies showed that the dispersion quality was excellent and that the pigment particles were essentially of submicron size, with rare units to 7 microns. When the concentrate was let down to a 2% pigment loading in the poly(ethylene terephthalate) and spun into 4.1 denier filaments and drawn according to the procedure of Example 1, the fibers had a tenacity of 2.8 grams/denier, an elongation of 45%, a modulus of 67 grams/denier and an intrinsic viscosity of 0.467. Yarns therefrom were texturized without mark-off.

EXAMPLE 9

The procedure of Example 1 was repeated except that 100 parts of the granules were blended with 93 parts of a dried and pulverized copolyester containing as mole % of the copolyester 37.3% of ethylene glycol, 13.3% of neopentyl glycol and 49.4% of terephthalic acid, the copolyester having an intrinsic viscosity of 0.66 and a melting point (Fisher Johns) of 175°–178° C. The pelleted concentrate contained 25% of carbon black, 20.7% of Resin A, 48% of the copolyester and 6.3% of surfactant. Dispersion quality was excellent.

90 Parts of the ground copolyester of this example were substituted for the 90 parts of Resin A, charged to the flushing tank and the charge was agitated, heated and neutralized as in Example 1. At this point the pigment was in the form of fine flocculates suspended in the water phase, no transfer of pigment to the copolyester phase having occurred. Heating the suspension to 96° C. to remove the solvent did not produce granules. When the batch was run out onto a screen to remove the bulk of the water, the flocculated pigment washed through leaving the nonuniformly coated copolyester. Microscopic examination of the copolyester revealed that the pigment was not dispersed in the copolyester but was present on the surface of the particles.

EXAMPLE 10

The procedure of Example 2 was repeated except that the copolyester of Example 9 was substituted for the copolyester of Example 1. Uniform pellets of fine dispersion quality were obtained.

EXAMPLE 11

The procedure of Example 3 was repeated except that the copolyester of Example 9 was substituted for the copolyester of Example 3. Uniform pellets of good dispersion quality were obtained.

EXAMPLE 12

The procedure of Example 4 was repeated except that the copolyester of Example 9 was substituted for the copolyester of Example 4. The same dispersion quality of the concentrate of this example was the same as that of Example 4.

EXAMPLE 13

The procedure of Example 1 was repeated except that ground Resin B was substituted for Resin A and 100 parts of the granules were blended with 93 parts of the copolyester of Example 9. Uniform pellets of good dispersion were obtained. The pellets of this example contained 25% of carbon black, 20.5% of Resin B, 48.3% of the copolyester and 6.2% of the surfactant. The physical properties of the fibers of this example were comparable to those of Example 1. Texturization gave no evidence of mark-off.

EXAMPLE 14

The procedure of Example 13 was repeated except that ground Resin E was substituted for Resin B. Dispersion was excellent and the colored poly(ethylene terephthalate) fibers therefrom had physical properties comparable to those of Example 1. Texturization gave no evidence of mark-off.

EXAMPLE 15

The procedure of Example 13 was repeated except that ground Resin F was substituted for Resin B. Uniform pellets of good dispersion quality were obtained. Colored poly(ethylene terephthalate) fibers therefrom had physical properties comparable to those of Example 13. Texturization of the fibers gave no evidence of mark-off.

EXAMPLE 16

A pebble mill was charged with 308 parts of carbon black dry color (Regal 660), 252 parts of Resin A and 2240 parts of water and the charge was milled for 40 hours, following which time the charge was dumped and the resulting slurry was dried out overnight in a circulating air oven at 82° C. 100 Parts of the dried pigmented resin were master-batched with 84 parts of the copolyester of Example 3 and the batch was mulled portion-wise on a hot plate at 204° C. for 50 double strokes to simulate extrusion and then cooled. The concentrate so produced contained 30% of carbon black, 24.3% of Resin A and 45.7% of the copolyester. When the concentrate of this example was let down to 0.5% pigment in the clear poly(ethylene terephthalate) of Example 1, the dispersion quality was good with essentially all of the particles in the submicron size with occasional units of 1–3 microns and rare units up to 12 microns.

EXAMPLE 17

A pebble mill was charged with 245 parts of carbon black dry color (Regal 660), 36.8 parts of Resin C, 10 parts of the nonionic wetting agent octylphenoxy polyethoxy ethanol (Triton X-100), 1310 parts of water and 208 parts of a dried and pulverized copolyester containing as mole % of the copolyester 37.9% of ethylene glycol, 0.5% of diethylene glycol, 11.6% of neopentyl glycol, 49.5% of terephthalic acid and 0.5% of isophthalic acid, the copolyester having an intrinsic viscosity of 0.19 and a melting point (Fisher Johns) of about 108° C. The charge was milled for 40 hours, following which time the charge was dumped and the resulting slurry was filtered and dried out overnight in a circulating air oven at 93° C. 100 Parts of the dried pigmented resin mixture were master-batched with 43 parts of the copolyester of Example 9 and the batch was mulled portion-wise on a hot plate at 204° C. for 50 double strokes to simulate extrusion and then cooled. The concentrate so produced contained 35% of carbon black, 5.25% of Resin C and 59.8% of the copolyester mixture. When the concentrate of this example was let down to 0.5% pigment in the clear poly(ethylene terephthalate) of Example 1, the dispersion quality was excellent with essentially all of the particles in the submicron size with occasional units of 1–3 microns and rare units up to 12 microns.

EXAMPLE 18

A pebble mill was charged with 217 parts (dry pigment basis) of α-copper phthalocyanine blue presscake, 43.2 parts of 1-(2-hydroxyethyl)-2-n-heptadecenyl-2-imidazoline, 5.0 parts of the nonionic wetting agent octylphenoxy polyethoxy ethanol, 108 parts of Resin A, 1340 parts of water and 113 parts of a dried and pulverized copolyester containing as weight % of the copolyester 34.9% of ethylene glycol, 2.3% diethylene glycol, 0.4% of neopentyl glycol, 38.7% of terephthalic acid and 23.7% of isophthalic acid, the copolyester having an intrinsic viscosity of 0.5 and a melting point (Fisher Johns) of about 150° C. The charge was milled for 60 hours, following which time the charge was dumped and the resulting slurry was filtered and dried out overnight at 93° C. 100 Parts of the dried pigmented resin mixture were master-blended with 50 parts of linear poly(butylene terephthalate) having an intrinsic viscosity of 0.77 and a crystalline melting point of 225° C. and the batch was mulled portion-wise on a hot plate at 225° C. for 50 double strokes to simulate extrusion and then cooled. The concentrate so produced contained 30% of copper phthalocyanine blue, 15% of Resin A, 6% of the imidazoline, 15.7% of the copolyester and 33.3% of the poly(butylene terephthalate). When the concentrate was let down to 0.5% pigment in the clear poly(ethylene terephthalate) of Example 1, microscopic studies showed that the dispersion quality was good, with essentially all of the particles in the submicron size with several units in the 2–4 micron range and occasional units up to 12 microns.

EXAMPLE 19

The procedure of Example 18 was repeated except that 50 parts of a dried and pulverized linear copolyester of ethylene glycol and a 90:10 terephthalic-isophthalic acid mixture, the copolyester having an intrinsic viscosity of 0.65 and a crystalline melting point of 230° C., was substituted for the 50 parts of poly(butylene terephthalate) and the batch was mulled at 230° C. The concentrate so produced contained 30% of copper phthalocyanine blue, 15% of Resin A, 6% of surfactant and 49% of the copolyester mixture. When the concentrate was let down to 0.5% pigment in the clear poly(ethylene terephthalate) of Example 1, the dispersion quality was excellent and essentially all of the particles were in the submicron size.

EXAMPLE 20

550 Parts of carbon black dry color (Regal 660) were charged into a pebble mill with 137.5 parts of the cationic surfactant of Example 1 and 1512.5 parts of water. This mixture was ground for 20 hours, dumped and then given two passes through a Gaulin mill at 4500–5000 p.s.i. The product was a fluid aqueous dispersion of carbon black whose particles were colloidal in character (predominantly under 0.5 micron in size).

An agitated stainless steel flushing tank was charged with 6000 parts of water, the above aqueous dispersion, 450 parts of a ground styrene-α-methyl styrene copolymer (Resin D) and 315 parts of mineral spirits. Agitation was commenced and the charge was heated to 40° C., following which the pH was adjusted to 9.5–10.0 with 25% aqueous caustic. Next, the charge was heated to 94° C. and maintained at the boil until the solvent was steam distilled, after which cooling water was added to reduce the temperature and harden the granules. The batch was run onto a screen to remove the bulk of the water and the partly dewatered material was thoroughly washed with water and dried at 82° C. for 40 hours.

100 Parts of the above granules were tumble blended with 94 parts of the copolyester of Example 9 and the blend was extruded through a non-vented extruder fitted with a 2-stage compounding screw and a strand die at about 149° C. and the strands were chopped into pellets approximately 3/32 × 3/32 inches in size. The pelleted concentrate contained 25% of carbon black, 20.3% of Resin D, 6.2% of surfactant and 48.5% of the copolyester. When the concentrate was let down to a 0.5% pigment level with the clear poly(ethylene terephthalate) of Example 1, microscopic studies indicated that the pigment dispersion was uniform and the pigment particles were in the submicron range with rare units up to 4 microns in size.

As can be seen by the above examples, the pigment concentrates of the invention are characterized by being uniform, intimate dispersions which are essentially free of agglomerates. The concentrates can be let down with fiber forming polymers and melt spun readily into uniformly colored fibers. The fibers can be stretched without breakage to filaments of fine denier with excellent tenacities. Yarn therefrom can also be texturized with no evidence of mark-off.

What I claim and desire to protect by Letters Patent is:

1. A pelletizable pigment concentrate comprising an essentially agglomerate free intimate dispersion of by weight (a) from 20 to 55% of pigment,
(b) from 5 to 35% of a friable dispersing resin having a softening point range of about 70° C. to about 195° C. and being selected from the group consisting of hydrocarbon resins having a molecular weight range of from about 350 to about 2000 and rosin esters, and
(c) from 30 to 65% of a polyester, at least 30% of which is at least one copolyester prepared from (1) ethylene glycol, (2) at least one aliphatic or cycloaliphatic diol containing 4 to 10 carbon atoms and (3) at least one difunctional dicarboxylic acid or its ester derivative, said copolyester having an intrinsic viscosity between about 0.45 and about 0.75 and a melting point range of about 140° to about 200° C.

2. The concentrate of claim 1 wherein the dispersing resin is an aromatic hydrocarbon resin derived from petroleum sources.

3. The concentrate of claim 2 wherein the hydrocarbon resin has a ball and ring softening point of about 140° C.

4. The concentrate of claim 3 also containing from 2 to 25% by weight of the pigment of a cationic surfactant.

5. A uniformly colored polyester composition comprising an essentially agglomerate-free homogeneous blend of unpigmented thermoplastic linear polyester and at least a coloring amount of the pigment concentrate of claim 1.

6. The composition of claim 5 wherein the linear polyester is poly(ethylene terephthalate).

7. A fiber of the composition of claim 6.

* * * * *